United States Patent
Ghaffarzadegan et al.

(10) Patent No.: US 11,176,422 B2
(45) Date of Patent: Nov. 16, 2021

(54) APPARATUS AND SYSTEM FOR UNSUPERVISED DISENTANGLED REPRESENTATION LEARNING WITH A RESIDUAL VARIATIONAL AUTOENCODER

(71) Applicant: Robert Bosch GmbH, Stuttgart (DE)

(72) Inventors: Shabnam Ghaffarzadegan, San Mateo, CA (US); Nanxiang Li, San Mateo, CA (US); Liu Ren, Cupertino, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 71 days.

(21) Appl. No.: 16/535,710

(22) Filed: Aug. 8, 2019

(65) Prior Publication Data

US 2021/0042583 A1    Feb. 11, 2021

(51) Int. Cl.
| | | |
|---|---|---|
| G06K 9/62 | (2006.01) | |
| G06K 9/00 | (2006.01) | |
| G06N 3/04 | (2006.01) | |

(52) U.S. Cl.
CPC ....... *G06K 9/6262* (2013.01); *G06K 9/00718* (2013.01); *G06N 3/04* (2013.01)

(58) Field of Classification Search
CPC ..... G06K 9/6262; G06K 9/00718; G06N 3/04
See application file for complete search history.

(56) References Cited

U.S. PATENT DOCUMENTS

| | | | | |
|---|---|---|---|---|
| 2020/0104990 A1* | 4/2020 | Kimura | ........... | G16H 50/70 |
| 2020/0160201 A1* | 5/2020 | Katuwal | ........... | G06N 3/08 |
| 2020/0293497 A1* | 9/2020 | Wu | ........... | G06F 16/1744 |
| 2020/0351509 A1* | 11/2020 | Lee | ........... | G06N 3/0454 |
| 2020/0401900 A1* | 12/2020 | Lee | ........... | G06N 3/04 |

FOREIGN PATENT DOCUMENTS

WO    2018224447 A1    12/2018

OTHER PUBLICATIONS

Higgins et al., "Beta-VAE: Learnign Basic Visual Concepts with a Contrained Variational Framework", Published as a conference paper at ICLR 2017, 22 pages.
Locatello et al., "Challenging Common Assumptions in the Unsupervised Learning of Disentangled Representations", arXiv:1811.12359v3 [cs.LG], Mar. 5, 2019, 38 pages.
Kim et al., "Disentangling by Factorising", Proceedings of the 35th International Conference on Machine Learning, Sweden, PMLR 80, 2018, 10 pages.

(Continued)

*Primary Examiner* — Utpal D Shah
(74) *Attorney, Agent, or Firm* — Dickinson Wright PLLC (57) ABSTRACT

A computer-program product storing instructions which, when executed by a computer, cause the computer to receive an input data, encode the input via an encoder, during a first sequence, obtain a first latent variable defining an attribute of the input data, generate a sequential reconstruction of the input data utilizing the decoder and at least the first latent variable, obtain a residual between the input data and the reconstruction utilizing a comparison of at least the first latent variable, and output a final reconstruction of the input data utilizing a plurality of residuals from a plurality of sequences.

20 Claims, 4 Drawing Sheets

(56) References Cited

OTHER PUBLICATIONS

Chen et al., "Isolating Sources of Disentanglement in VAEs", 32nd Conference on Neural Information Processing Systems (NeurIPS 2018), Canada, arXiv:1802.04942v4 [cs.LG], Jan. 22, 2019, 25 pages.

Cai et al., "Multi-Stage Variational Auto-Encoders for Coarse-to-Fine Image Generation", arXiv:1705.07202v1 [cs.CV], May 19, 2017, 9 pages.

Burgess et al., "Understanding disentangling in Beta-VAE", arXiv:1804.03599v1 [stat.ML], Apr. 10, 2018, 31st Conference on Neural Information Processing Systems (NIPS 2017), California, 11 pages.

Kumar et al., "Variational Inference of Disentangled Latent Concepts from Unlabeled Observations", arXiv:1711.00848v3 [cs.LG], Dec. 27, 2018, Published as aconference paper at ICLR 2018, New York, 16 pages.

\* cited by examiner

APPARATUS AND SYSTEM FOR UNSUPERVISED DISENTANGLED REPRESENTATION LEARNING WITH A RESIDUAL VARIATIONAL AUTOENCODER

TECHNICAL FIELD

The present disclosure relates to augmentation and image processing of an image utilizing an autoencoder.

BACKGROUND

Deep convolutional neural networks (CNNs) may have a tendency to learn superficial statistics of data associated with given tasks rather than underlying important generative factors embedded in the physical world. For example, a system may be trained to identify an animal (e.g. a cat), but not the important factors that may be associated with a cat (e.g. whiskers, distinctive ears, distinctive eyes, etc.).

SUMMARY

According to one embodiment, a system comprises a camera configured to obtain image information from objects and a processor in communication with the camera and programmed to receive an input data including the image information, encode the input via an encoder, during a first sequence, obtain a first latent variable defining an attribute of the input data, generate a sequential reconstruction of the input data utilizing the decoder and at least the first latent variable, obtain a residual between the input data and the reconstruction utilizing a comparison of at least the first latent variable, and output a final reconstruction of the input data utilizing a plurality of residuals from a plurality of sequences.

According to another embodiment, an apparatus comprises a processor programmed to receive an input data, encode the input via an encoder, during a first sequence, obtain a first latent variable defining an attribute of the input data, generate a sequential reconstruction of the input data utilizing the decoder and at least the first latent variable, obtain a residual between the input data and the reconstruction utilizing a comparison of at least the first latent variable, and output a final reconstruction of the input data utilizing the decoder and a plurality of residuals from a plurality of sequences.

According to a last embodiment, a computer-program product storing instructions which, when executed by a computer, cause the computer to receive an input data, encode the input via an encoder, during a first sequence, obtain a first latent variable defining an attribute of the input data, generate a sequential reconstruction of the input data utilizing the decoder and at least the first latent variable, obtain a residual between the input data and the reconstruction utilizing a comparison of at least the first latent variable, and output a final reconstruction of the input data utilizing a plurality of residuals from a plurality of sequences.

DETAILED DESCRIPTION

Recent advancements in unsupervised disentangled representation learning focused on extending the variational autoencoder (VAE) with an augmented objective function to balance the trade-off between disentanglement and reconstruction due to the information bottleneck of VAE. A Residual Variational Autoencoder (Res-VAE) may include a "Residual learning" mechanism as the training regime instead of the augmented objective function. It may learn from the residual between the input data and the accumulated reconstruction of sequentially added latent variables. Disentangled representation may be a representation where changes in one dimension correspond to changes only in one generative factors of data, while being relatively invariant to changes in other factors. This formulation may encourage the disentanglement in the latent space by inducing explicit dependency structure, and relaxes the network reconstruction by decomposing it into decoder output and residual. Res-VA may eliminate the hyperparameter tuning of the augmented objectives, which was a crucial step for the prior state-of-the-art performance.

Learning a sparse and interpretable representation of data is a critical component of a generalized, robust and explanatory intelligent system. Despite recent advances on representation learning, it was shown that deep convolutional neural networks (CNN's) have a tendency to learn superficial statistics of data associated with given tasks, rather than important generative factors embedded in the physical world. One way towards this is disentangled representation learning which aims to capture the independent and interpretable generative factors of the data. Disentangled representation may be a representation where changes in one dimension correspond to changes in only one generative factor of the data, while being relatively invariant to changes in other factors.

Disentangled representation can be learned in a supervised fashion where and/or implicit prior knowledge on the generative factors of data are available. However, it may be ideal to learn this in an unsupervised learning setting to take advantage of the large amount of available unlabeled data. Along with the recent development of the generative models, many disentangled learning approaches have been proposed based on either the generative adversarial networks (GAN) or the variational autoencoders (VAE). Unsupervised learning of disentangled representation is impossible without introducing inductive bias on either the model or the data. The trade-off between disentanglement and reconstruction in VAE-based approaches can be addressed by a different training approach. The idea of using a different training approach rather than augmenting the objective function is similar to using different methods to prevent model over-fitting. For example, one common way to address the over-fitting problem is to augment the objective function with regularization terms, such as $L^1$ or $L^2$ regularization. Another way is to apply special operations during training to enforce the generalization of the network representations, such as Dropout or Batch Normalization.

A Res-VAE may utilize a "Residual learning" mechanism to learn disentangled representation. The "Residual learning" mechanism may include an explicit dependency structure among the latent variables which encourages disentanglement. The Res-VAE system may decompose the reconstruction into residual and network output. This relaxation of the decoder reconstruction may reduce the trade-off between disentanglement and reconstruction and improve the disentangled representation learning.

Figure 1:
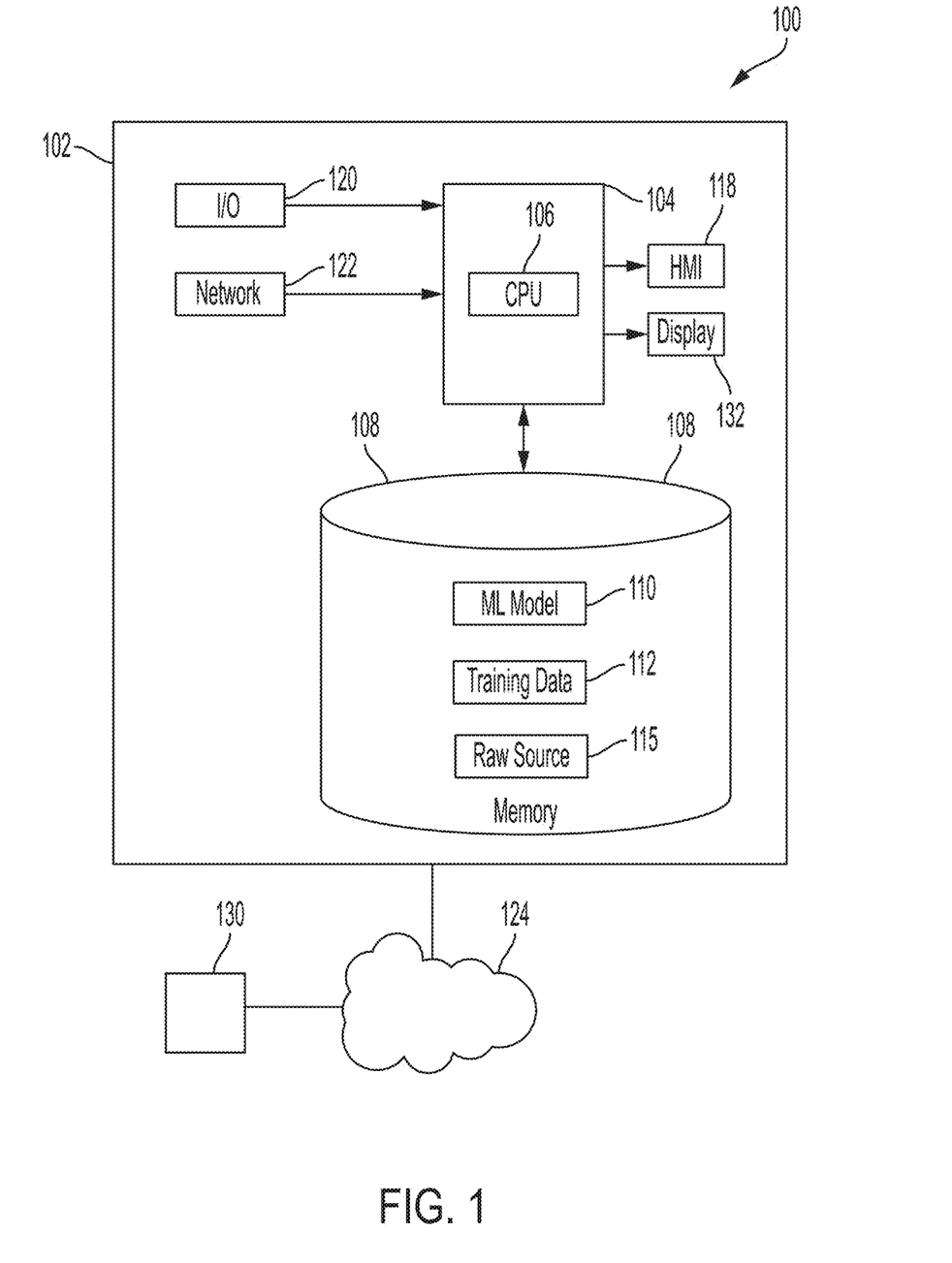
FIG. 1 discloses a block diagram of a computer system.

FIG. 1 depicts a data annotation system 100 to implement a system for annotating data The data annotation system 100 may include at least one computing system 102. The computing system 102 may include at least one processor 104 that is operatively connected to a memory unit 108. The processor 104 may include one or more integrated circuits that implement the functionality of a central processing unit (CPU) 106. The CPU 106 may be a commercially available processing unit that implements an instruction stet such as one of the x86, ARM, Power, or MIPS instruction set families. During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, a training dataset 112 for the machine-learning model 110, raw source dataset 115.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122.

The system 100 may be implemented using one or multiple computing systems. While the example depicts a single computing system 102 that implements all of the described features, it is intended that various features and functions may be separated and implemented by multiple computing units in communication with one another. The particular system architecture selected may depend on a variety of factors.

The system 100 may implement a machine-learning algorithm 110 that is configured to analyze the raw source dataset 115. The raw source dataset 115 may include raw or unprocessed sensor data that may be representative of an input dataset for a machine-learning system. The raw source dataset 115 may include video, video segments, images, text-based information, and raw or partially processed sensor data (e.g., radar map of objects). In some examples, the machine-learning algorithm 110 may be a neural network algorithm that is designed to perform a predetermined function. For example, the neural network algorithm may be configured in automotive applications to identify pedestrians in video images.

The computer system 100 may store a training dataset 112 for the machine-learning algorithm 110. The training dataset 112 may represent a set of previously constructed data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In this example, the training dataset 112 may include source videos with and without pedestrians and corresponding presence and location information. The source videos may include various scenarios in which pedestrians are identified.

The machine-learning algorithm 110 may be operated in a learning mode using the training dataset 112 as input. The machine-learning algorithm 110 may be executed over a number of iterations using the data from the training dataset 112. With each iteration, the machine-learning algorithm 110 may update internal weighting factors based on the achieved results. For example, the machine-learning algorithm 110 can compare output results (e.g., annotations) with those included in the training dataset 112. Since the training dataset 112 includes the expected results, the machine-learning algorithm 110 can determine when performance is acceptable. After the machine-learning algorithm 110 achieves a predetermined performance level (e.g., 100% agreement with the outcomes associated with the training dataset 112), the machine-learning algorithm 110 may be executed using data that is not in the training dataset 112. The trained machine-learning algorithm 110 may be applied to new datasets to generate annotated data.

The machine-learning algorithm 110 may be configured to identify a particular feature in the raw source data 115. The raw source data 115 may include a plurality of instances or input dataset for which annotation results are desired. For example, the machine-learning algorithm 110 may be configured to identify the presence of a pedestrian in video images and annotate the occurrences. The machine-learning algorithm 110 may be programmed to process the raw source data 115 to identify the presence of the particular features. The machine-learning algorithm 110 may be configured to identify a feature in the raw source data 115 as a predetermined feature (e.g., pedestrian). The raw source data 115 may be derived from a variety of sources. For example, the raw source data 115 may be actual input data collected by a machine-learning system. The raw source data 115 may be machine generated for testing the system. As an example, the raw source data 115 may include raw video images from a camera.

In the example, the machine-learning algorithm 110 may process raw source data 115 and output an indication of a representation of an image. The output may also include augmented representation of the image. A machine-learning algorithm 110 may generate a confidence level or factor for each output generated. For example, a confidence value that exceeds a predetermined high-confidence threshold may indicate that the machine-learning algorithm 110 is confident that the identified feature corresponds to the particular feature. A confidence value that is less than a low-confidence threshold may indicate that the machine-learning algorithm 110 has some uncertainty that the particular feature is present.

The VAE may be a deep directed graphical model consisting of an encoder and a decoder. The encoder may map the data x to a latent representation $q_\theta(z|x)$ and the decoder maps the latent representation back to the data space $q_\emptyset(x|z)$, where $\theta$ and $\emptyset$ represent model parameters. The loss function of the VAE may be defined as following:

$$\mathcal{L}_{VAE} = \mathbb{E}_{q_\theta(z|x)}[\log q_\emptyset(x|z)] - KL(q_\theta(z|x)\|p(z))$$

where $KL(\cdot\|\cdot)$ may be the Kullback-Leibler divergence between the true and the approximate posterior. By regularizing the posterior $q_\theta(z|x)$ with a prior over the latent representation $p(z) \sim \mathcal{N}(0,I)$, where I is an identity matrix, the VAE may learn a latent representation $q_\theta(z|x)$ that contains the variations in the data. In one example, an image may be utilized and the latent representation may be an attribute that explains a feature of the face. For example, one coordinate may include the gender of the face (e.g. a male or a female), whether the face has a certain expression (happy or sad for example), whether the face is old or young (e.g. does the face have wrinkles), etc. The disentangled representation learning may be used to identify the latent representation $z \in \mathbb{R}^d$ where each latent variable only corresponds to one of the generative factors for given data x. To achieve this, β-VAE augments VAE objective with an adjustable hyperparameter β as:

$$\mathcal{L}_{\beta\text{-}VAE} = \mathbb{E}_{q_\theta(z|x)}[\log q_\emptyset(x|z)] - \beta KL(q_\theta(z|x)\|p(z)) \quad (2)$$

When β=1, the β-VAE may become equivalent to the original VAE framework. The addition of β may encourage the posterior $q_\theta(z|x)$ to match the factorized unit Gaussian prior $p(z)$. This may enhance the independence among the latent variables of z thus disentangling the representation and breaking down features that can be generated from the image. On the other hand, it may reduce the amount of information about x stored in z, which can lead to a poor reconstruction especially for high values of β.

Table 1 is an example of a residual learning algorithm, as shown below:

| Algorithm 1 Residual_learning |
| --- |
| Input: observation x, latent dimension d > 1. VAE encoder (enc) $q_\theta$ (z\|x), VAE decoder (dec), $q_\phi$ (x\|z)<br>1: $\Delta \leftarrow x$<br>2: $\vec{\mu}' = [0, \ldots, 0] \in \mathbb{R}^d$<br>3: $\vec{\sigma}' = [0, \ldots, 0] \in \mathbb{R}^d$<br>4: for i = 0 to d do<br>    $\{\vec{\mu}, \vec{\sigma}\} \leftarrow enc(\Delta)$<br>    $\vec{\mu}'[i] = \vec{\mu}[i]$<br>    $\vec{\sigma}'[i] = \vec{\sigma}[i]$<br>    $\vec{z} \leftarrow$ Reparameterize $(\vec{\mu}', \vec{\sigma}')$<br>    $\hat{x} \leftarrow dec(\vec{z})$<br>    $\Delta \leftarrow \Delta - \hat{x}$<br>5: $x' \leftarrow dec(\vec{z}) + \Delta$<br>Output: reconstruction x', latent representation $\vec{\mu}', \vec{\sigma}'$ |

In one embodiment, the Res-VAE may define an explicit dependency structure among the latent variables. Such structure may be regarded as an inductive bias on the model. As explained further below, latent space structure may reduce the solution space with an emphasis on disentanglement. Moreover, Res-VAE may decompose the reconstruction into network output and residual. This may reduce the constraints on the network reconstruction, thus the trade-off between the and disentanglement. The Res-VAE may eliminate the hyperparameter tuning of the aforementioned approaches by training with the original VAE objective.

The Res-VAE may include an encoder network noted as $q_\theta(\vec{z}|x)$, and a decoder network noted as $q_\emptyset(x|\vec{z})$. Thus, x and $\vec{z}$ may stand for input data and latent representation vector, respectively. $\theta$ and $\emptyset$ may represent network parameters. Instead of the standard forward pass that updates all latent variables at the same time, Res-VAE may use a "Residual learning" mechanism to sequentially update the latent based on the residual between the input and the accumulated reconstructions.

Given the dimension of the latent space d>1 and the latent representation $\vec{z}=z_1, z_2, \ldots, z_d$, the "Residual learning" mechanism may include d forward passes. Each forward pass may update one latent variable at a time. In the first pass, the input data x passes through the encoder to calculate the parameterized posterior ($\vec{\mu}^1$ and $\vec{\sigma}^1$, superscript represents the pass number). Instead of drawing samples for all latent variables $\vec{z} \sim \mathcal{N}(\vec{\mu}^1, \vec{\sigma}^1)$, we only sample the first latent variable $z_1 \sim \mathcal{N}(\vec{\mu}^1[1], \vec{\sigma}^1[1])$ and set the remaining latent variables to 0. The modified latent variable $\vec{z}=[z_1, 0, \ldots, 0]$ then passes the decoder to generate the output, noted as $\hat{x}_1$. We take the difference between the input x and this output $\hat{x}_1$, noted as the residual $\Delta_1 = x - \hat{x}_1$, as the input for the second pass. For the second pass, $\Delta_1$ passes the encoder to generates a new parameterized posterior ($\vec{\mu}^2$ and $\vec{\sigma}^2$). This time, we sample only the second latent variable with this parameterized posterior as $z_2 \sim \mathcal{N}(\vec{\mu}^2[2], \vec{\sigma}^2[2])$. We re-sample the first latent variable with $z_1 \sim \mathcal{N}(\vec{\mu}^1[1], \vec{\sigma}^1[1])$ while setting the remaining latent variables to 0. The modified latent variable variable $\vec{z}=[z_1, z_2, 0, \ldots, 0]$ is then used to generate the new reconstruction $\hat{x}_2$. We then calculate the corresponding residual $\Delta_2 = \Delta_1 - \hat{x}_2$ as the input for the third pass. In the ith pass, the ith latent variable is sampled from the encoding of current residual $\Delta_{i-1}$ thus $z_i \sim \mathcal{N}(\vec{\mu}'[i], \vec{\sigma}'[i])$. The previous updated latent variables follow their corresponding residual encoding and the later latent variables are set to zeros. The latent variable $\vec{z}=[z_1, z_2, \ldots, z_i, 0, \ldots, 0]$ passes the decoder and generate the new residual $\Delta_i$. The process repeats d times such that all the latent variables are sampled. In one example, the Res-VAE may not produce optimal results when the latent dimension d=1. In this case, the residual can compensate for any decoder output and produce zero reconstruction error.

A Res-VAE may be able to be trained with an original VAE objective defined in Eq. 1. The parameters are updated using the standard back-propagation. The prior p(z) may be set to the isotropic unit Gaussian $\mathcal{N}(0,I)$ and posterior $q_\theta(z|x)$ may be parameterized as Gaussians with a diagonal covariance matrix. "Reparametrization" may be used to transform each random variable $z_i \sim q_\theta(z|x)$ as a differentiable transformation of a noise variable $\in \sim \mathcal{N}(0,1)$ with $z_i = \mu_i + \sigma_i \in$ The Residual learning mechanism may define the sequential update of latent variables. It may define dependency among the latent variables in the posterior that can be written as $q_\theta(z_1, z_2, \ldots, z_d|x) = q_\theta(z_1|x) q_\theta(z_2|z_1, x) \ldots q_\theta(z_d|z_1, \ldots z_{d-1}, x)$. The KL loss term of the original VAE objective in Eq. 1 encourages the posterior $q_\theta(z_1, z_2, \ldots, z_d 51 x)$ to match the factorized unit Gaussian prior $p(\vec{z})$. Adding the explicit dependency by the "Residual learning" mechanism, the Res-VAE objective can be seen as a modified VAE objective:

$$\text{minimize } \mathcal{L}_{VAE} = \mathbb{E}_{q_\theta(\vec{z}|x)}[\log q_\Theta(x|\vec{z})] - KL(q_\theta(\vec{z}|x) \| p(\vec{z})),$$

$$\text{subject to } p(z_1) \sim q_\theta(z_1|x), p(z_2) \sim q_\theta(z_2|z_1, x), \ldots, p(z_d) \sim q_\theta(z_d|z_1, \ldots, z_{d-1}, x).$$

These constraints encourage the newly added latent variable to be independent of the ones already added, thus enhance the disentanglement of the latent representation. Moreover, the solution space of Eq. 3 is a subset of the original VAE. By reducing the search space, we can get to the solution space faster, and be less sensitive to the initialization. In experiment section, we show that Res-VAE is less sensitive to initialization comparing with other methods.

The Res-VAE may sample each latent variable from its corresponding residual encoding $z_i \sim q_\theta(z_i|\Delta_{i-1})$. Other VAE based approaches, however, may generate reconstruction by sampling from the joint distribution $\vec{z} \sim q_\theta(\vec{z}|x)$ for all latent variables. As a result, Res-VAE can generate a sequence of images during the forward pass. Such images may reflect image transformations corresponding to the disentangled factors. The Res-VAE may update the latent variables one at a time in a sequential order (e.g. a sequential forward pass). Each latent variable may aim to encode the residual between the input and the information encoded by previously updated latent variables. This may reduce interference among the latent variables and encourage disentangled latent representations. Furthermore, iterative encoding of the residuals may enable a high-order detail of input data to be encoded that could lead to better reconstruction quality.

The final output of Res-VAE x' consists of $\hat{x}_d$ and $\Delta_d$. Given the information bottleneck of VAE, $\Delta_d$ relaxes the reconstruction constraint on the network. Such relaxation allows the network to better match the posterior with the prior of an isotropic unit Gaussian. This decomposition of the reconstruction is related to the problem formulation in InfoGAN where the input noise vector is divided into the source of incompressible noise and the salient structured semantic features of the data distribution. The former corresponds to the $\Delta_d$ and the latter corresponds to the $\hat{x}_d$. A similar idea is also discussed in β-VAE where latent factors are categorized into disentangled and entangled generative factors. In this case, let $\vec{v}$ represents the disentangled generative factors and $\vec{w}$ represents the entangled counterpart, so $\vec{z}=(\vec{z},\vec{w})$. The data generating process can be formulated as $q_\Theta(x|\vec{z}) \approx q_\Theta(x|\vec{v},\vec{w})$. Both $\vec{v}$ and $\vec{w}$ are learned jointly using the objective in Eq. 2. In Res-VAE, the $\Delta_d$ can be regarded as the reconstruction from the entangled generative factors w thus separating them from disentangled ones. A difference between Res-VAE and the two aforementioned formulations is that in Res-VAE encoder/decoder networks focus on learning the disentangled factors, among other things. In contrast, other approaches use encoder/decoder networks to learn both entangled and disentangled factors. This difference may allow Res-VAE to reduce the trade-off between reconstruction and disentanglement.

A closer look at the Res-VAE reconstruction shows that it may be $x' = \hat{x}_d + \Delta_d = \hat{x}_d + \Delta_{d-1} - \hat{x}_d = \Delta_{d-1} = x - \sum_{i=1}^{d-1} \hat{x}_i$. For $L^2$ norm reconstruction loss, minimizing $\|x-x'\|^2$ equivalent to minimizing the accumulated decoder output from step 1 to d-1 as $\|\sum_{i=1}^{d-1} \hat{x}_i\|^2$ Each $\hat{x}_i$ can be regarded as an image transformation corresponding to the added latent variable at step i. This may minimize the effect of the added latent variables seeking the minimum number of latent variables to represent the data. Along with the KL loss term, this formulation encourages learning the independent data generative factors. Notice that directly using the equivalent objective may lead to a solution where the network learns to output zeros for all the steps. In Res-VAE, this may rarely happen due to the existence of the residual term.

Res-VAE may replace the standard forward pass of VAE with d forward passes. However, in addition to improved state-of-the-art performance, it eliminates the hyperparameter tuning associated with other prior systems. Hyperparameter tuning may be shown to be critical for state-of-the-art performance. It may be a difficult and time-consuming process, especially for unlabeled data, due to: the large hyperparameter search space of continuous values; the lack of evaluation metric, commonly evaluated by human visual inspection. As a result, the increased computational complexity by Res-VAE is reasonable compared to the cost of hyperparameter tuning. Moreover, we will show that each of the d forward passes in Res-VAE correspond to a disentangled generative factor. Visualization of these intermediate steps provides a new way to understand the result.

Figure 2:
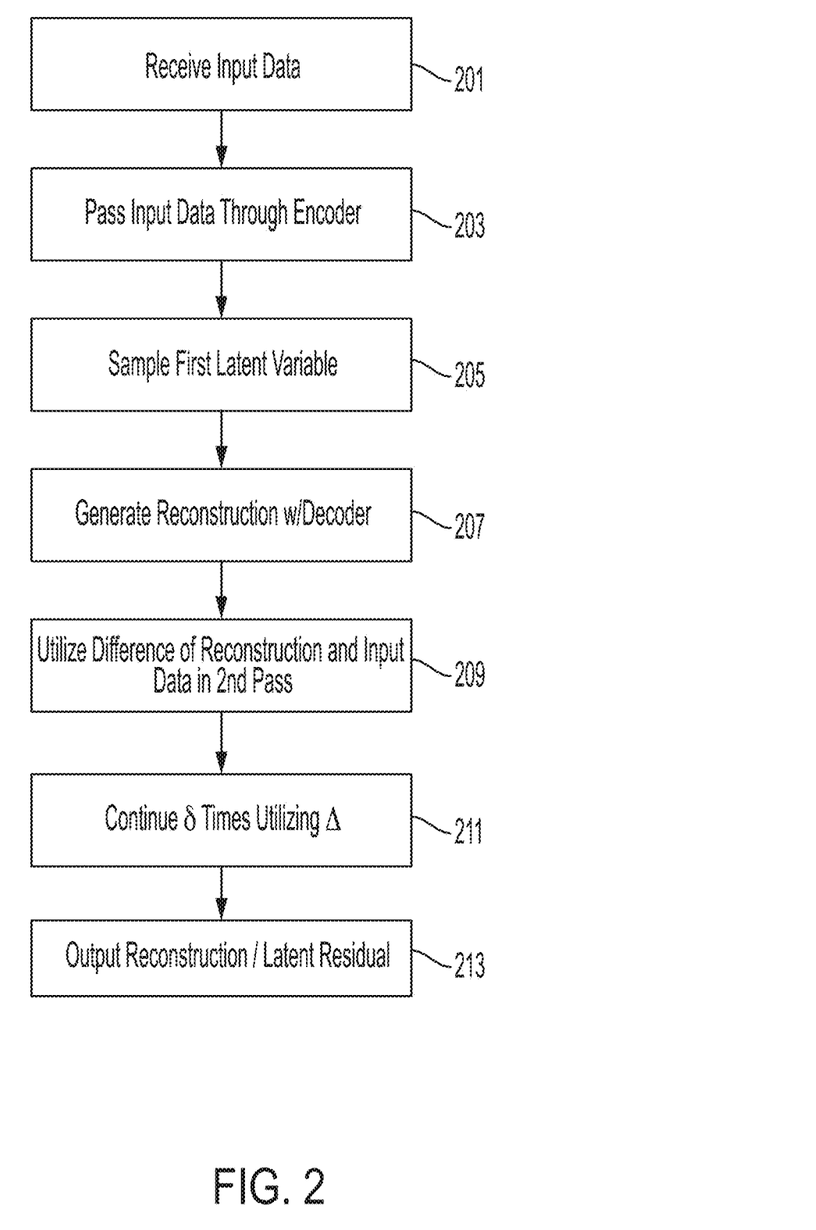
FIG. 2 discloses a flow chart of a residual variational autoencoder (VAE) and residual learning software application.

FIG. 2 represents a flowchart of the Res-VAE mechanism. The residual learning mechanism may replace a single forward pass with d forward passes. In the first pass and at step 201, the system may receive the input data x. The input data x may be an image, video, or some other type of object identification data.

At step 203, the system may pass the input data through the encoder and calculate the parameterized posterior, which may be calculated utilizing the pth pass. At step 205, the system may sample the first latent variable and set the rest of the latent variables to zero. Thus, rather than sample all latent variables, simply one latent variable is sampled. The modified latent variable may then be utilized to generate the reconstruction utilizing the decoder.

At step 207, the system may then generate the reconstruction utilizing the decoder. In step 207, the modified latent variable may be utilized to generate the reconstruction. At step 209, the difference between the reconstruction and the input data may be take as the input for the second pass. The second pass to the encoder generates for the corresponding residual. The system may then sample the second latent variable with this corresponding residual, and re-sample the first latent variable with the parameters learned in the first pass, all while the remaining latent variables are set to zero. The modified latent variable may then be used to generate the reconstruction as well as calculating the corresponding residual. At step 211, the system may continue d times until all the latent variables are sampled. At the pth pass, the latent variable may be sampled from the distribution learned from the corresponding residual (e.g. table in Alg. 1 for pseudocode for the residual learning mechanism.)

Figure 3:
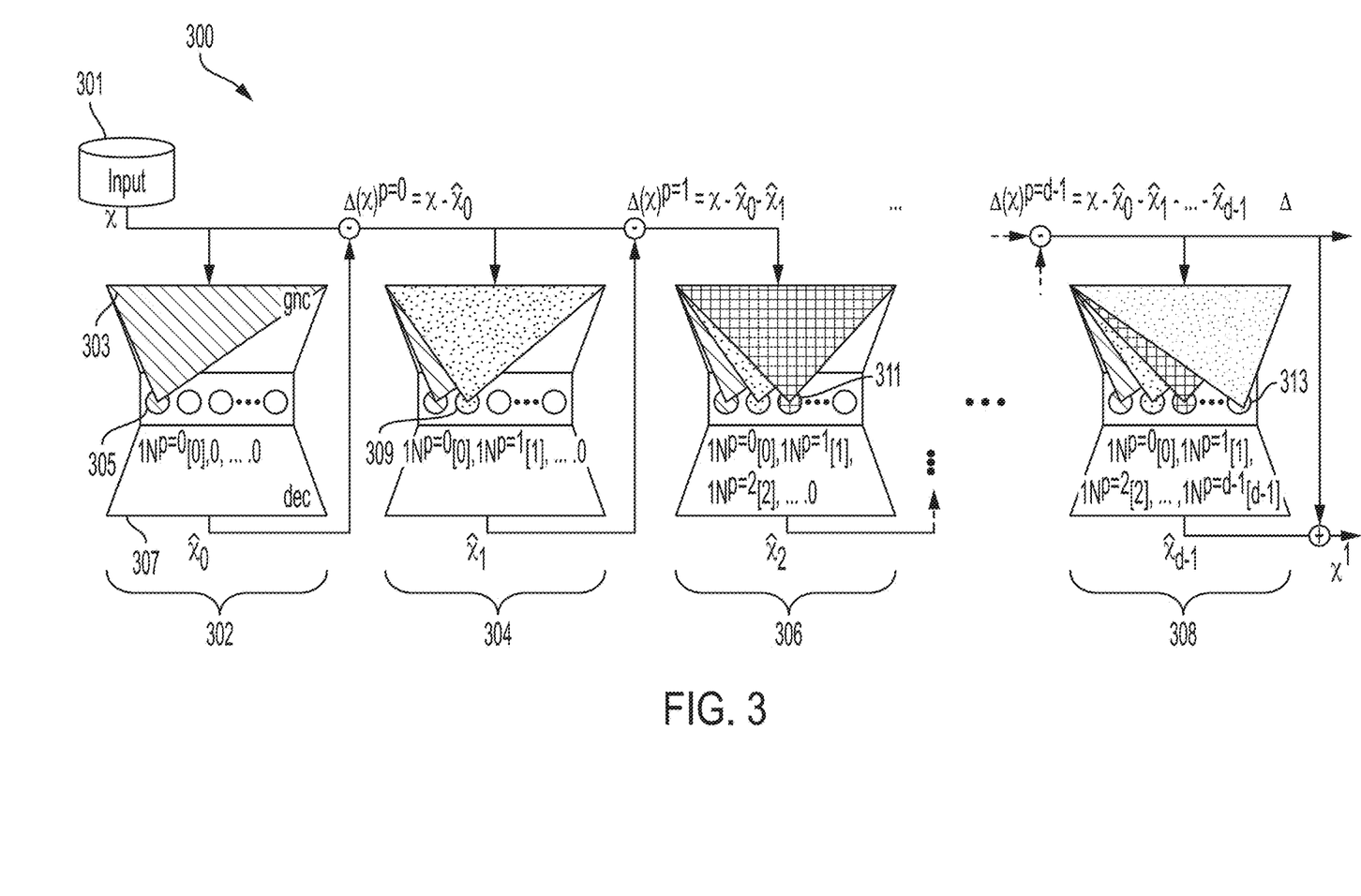
FIG. 3 discloses a block diagram of a residual variational autoencoder and residual learning software application.

FIG. 3 discloses a block diagram 300 of a residual variational autoencoder (VAE) and residual learning software application. The input 301 may be fed into the encoder 303 at a first pass 302. In the block diagram 300 of FIG. 3, there may also be multiple passes, including a second pass 304, a third pass 306, and Nth pass 308. The latent variables may be sequentially updated to learn the residual between the input data and the reconstruction from the previous updated latent variables (e.g. 305, 309, 311, 313) during each forward pass (e.g. 302, 304, 306). The network may output the reconstruction, x'. The Res-VAE may include an encoder network 303 that may be $q_\theta(\vec{z}|x)$, and a decoder network 307 that may be $q_\varnothing(x|\vec{z})$.

The decoder output of each internal step ($\hat{x}_1, \ldots, \hat{x}_{10}$) and their corresponding residuals ($\Delta_1, \ldots, \Delta_{10}$) may be output. The result may show that the decoders output and residuals may work together to capture the learned disentangled factor at each step. For example, factors in each step may be X-position, Y-position, Size, Rotation+shape, and Shape, respectively. In one example, the X-position of the reconstructed image are generated during the first step. In step two, both X-position and Y-position may be generated. This process may continue and at each step the decoder 307 output and the residual transform the image according to the learned latent encoding.

The mechanism may decompose the input data in a linear fashion as:

$$x = \Sigma_{i=1}^{d} \hat{x}_i + \Delta,$$

where $\hat{x}_i$ is the reconstruction from the first i latent variables and $\Delta$ stands for the residual. The formulation may encourage the latent representation to match the linear decomposition assumption.

The "redisual_learning" mechanism may consist of d forward passes with the same (or similar) encoder enc, $q_\theta(z|x)$, and decoder dec, $q_\varnothing(x|z)$. Latent variables (e.g. 305, 309, 311, 313) may be sequentially sampled from the encoding of the residual between the input data and the accumulated reconstruction. In each step, the added latent variable may follow the distribution learned from the current residual, while previous latent variables may follow the same distribution learned from their corresponding residuals.

Figure 4:
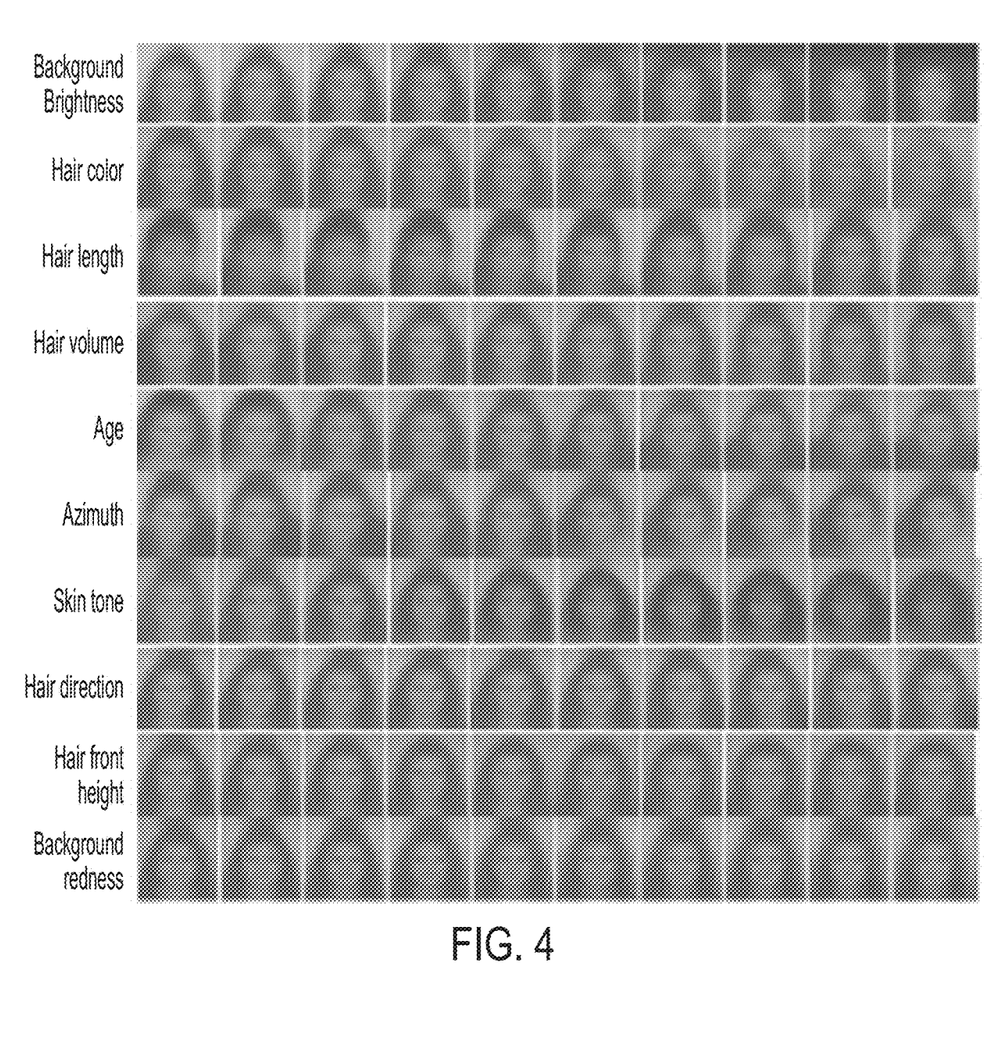
FIG. 4 discloses an example of latent traversals across each latent dimension for an example data set.

FIG. 4 discloses an example of latent traversals across each latent dimension for an example data set. The latent traversals across each latent dimension where d is set to 10, with the interpretation of the factor of variation corresponding to each latent dimension. The latent traversals across each latent dimension where d is set to 10 for 2D Shape dataset;. The Reconstruction of each step in Res-VAE method, internal process of the last column of (a). The Res-VAE is able to learn interpretable factors of variation such as background, face and hair characteristics, skin color, etc. Compared to β-VAE and FactorVAE, the system may observe more background hues, light source direction, etc. Careful tuning of parameters might potentially reveal more latent variables. However, Res-VAE may eliminate hyperparameter tuning, which may be a critical step for the prior state-of-the-art performance. For example, FIG. 4 shows examples at each latent dimension for different attributes, including background brightness, hair color, hair length, hair volume, age, azimuth, skine tone, hair direction, hair front height, background redness, etc. Of course, other attributes may be identified.

A possible advantage of Res-VAE is that it reduces the solution space and improve training stability. Res-VAE may have better performance and smaller variances, which means it may be less sensitive to the random seeds. We also examined if using the β-VAE objective in Eq. 2 with the "Residual learning" mechanism would improve the performance, referred to as Res-β-VAE. If so, the proposed "Residual learning" mechanism would benefit from the augmented objective to achieve better performance. Notice Res-VAE is a special case of Res-β-VAE where β=1. FIGS. 2(f) and 2(g) show that best disentanglement score is obtained by Res-VAE and higher β values do not help with improving the performance. These results verify the effectiveness of Res-VAE in solving the trade-off between disentanglement and reconstruction.

A re-arrangement of the components in Res-VAE reveals there may be similarities to the ResNets. ResNets have achieved the state-of-the-art performance in various computer vision benchmarks. The key idea of ResNets is to replace learning the direct mapping between input and output (H(x)=x→y) with learning a residual formulation (H(x)=F(x)+x→y) where F(x) represents stacked non-linear layers. This formulation reduces the loss of important information while propagating through the network. In addition, it was suggested that learning the residual mapping is easier compared to learning the direct mapping. Another interpretation of the effectiveness of ResNets is their equivalent form as ensembles of shallow networks.

In one example, a real-image dataset without ground truth generative factors. It may contain ten thousand different celebrity identities, each with twenty images. Each image is annotated with forty face attributes such as: young, pale skin, bangs, straight hair, no beards, etc. Cropped 64×64×3 face images may be used as the input data in such an example.

A meteric may be calculated by selecting a latent factor k, generating new data y with factor k fixed and other factors varying randomly, calculating the mean of $q_\theta(z|y)$, normalizing each dimension by its empirical standard deviation over all the data or a large enough subset (for example, a threshold amount subset (e.g. more than 80%), building a majority-vote classifier with the input of index of the dimension with the lowest variance and the output of factor k. The classifier accuracy may be used as the evaluation metric.

In general, there may be three criteria of disentangled representation, namely disentanglement, completeness and informativeness. Disentanglement may be the degree to which the learned representation disentangles the underlying generative factors; completeness is the degree to which the generative factors are captured by one latent representation; and finally the informativeness is the amount of information of the generative factors that is captured by the latent representation. Disentanglement and completeness may be perceived by visualizing rows and columns of the Hinton diagram; and informativeness is calculated based on the mapping error between the learned latent representation and the ground truth factors.

Thus, a Res-VAE may be utilized for disentangled representation learning in an unsupervised setting. A "Residual learning" mechanism in the training regime, as opposed to an augmented objective, may allow a trade-off between disentanglement and reconstruction of the VAE-based approaches. Res-VAE defines explicit dependency structure between latent variables and decomposes the reconstruction into decoder output and residual terms. The Res-VAE can be directly applied to any VAE architecture without an additional hyperparameter tuning. The step-by-step process of the Res-VAE may visualize the results and understand the internal process of learning disentangled factors.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system, comprising:
   a camera configured to obtain image information from objects; and
   a processor in communication with the camera and programmed to:
   receive an input data including the image information;
   encode the input via an encoder;
   during a first sequence, obtain a first latent variable defining an attribute of the input data, generate a sequential reconstruction of the input data utilizing a decoder and at least the first latent variable, obtain a residual between the input data and the reconstruction utilizing a comparison of at least the first latent variable; and
   output a final reconstruction of the input data utilizing a plurality of residuals from a plurality of sequences.

2. The system of claim 1, wherein the processor is configured to update only one latent variable during each forward pass sequence.

3. The system of claim 1, wherein the plurality of sequences includes a plurality of latent variables utilized.

4. The system of claim 1, wherein the encoder is a neural network encoder.

5. The system of claim 1, wherein the processor is programmed to output a final latent representation comparing a first latent variable from at least the first sequence and a second latent variable in a second sequence.

6. The system of claim 1, wherein the input data includes video information obtained from the camera.

7. An apparatus, comprising:
   a processor programmed to:
   receive an input data;
   encode the input via an encoder;
   during a first sequence, obtain a first latent variable defining an attribute of the input data, generate a sequential reconstruction of the input data utilizing a decoder and at least the first latent variable, obtain a residual between the input data and the reconstruction utilizing a comparison of at least the first latent variable; and
   output a final reconstruction of the input data utilizing the decoder and a plurality of residuals from a plurality of sequences.

8. The apparatus of claim 7, wherein the processor is further programmed obtain the residual between the input data and the sequential reconstruction from a previously updated latent variable.

9. The apparatus of claim 7, wherein the processor is further programmed to update the first latent variable after the first sequence and update a second latent variable after a second comparison of utilizing at least the second latent variable.

10. The apparatus of claim 7, wherein the processor is further programmed to in the first sequence, compare the residual of the first and second latent variable and in a second sequence, compare the residual between the first and second latent variable.

11. The apparatus of claim 7, wherein the encoder is a neural network encoder.

12. The apparatus of claim 10, wherein the processor is further programmed to update the latent variables during each forward pass during a plurality of forward pass sequences.

13. A computer-program product storing instructions on a non-transitory computer-readable medium of a computer, which, when executed by the computer, cause the computer to:
send instructions on the non-transitory computer-readable medium of the computer to a processor of the computer, the processor programmed to:
receive an input data;
encode the input via an encoder;
during a first sequence, obtain a first latent variable defining an attribute of the input data, generate a sequential reconstruction of the input data utilizing a decoder and at least the first latent variable, obtain a residual between the input data and the reconstruction utilizing a comparison of at least the first latent variable; and
output a final reconstruction of the input data utilizing a plurality of residuals from a plurality of sequences.

14. The computer-program product of claim 13, wherein the input includes an image received from a camera in communication with the computer.

15. The computer-program product of claim 13, wherein the encoder includes a neural network.

16. The computer-program product of claim 13, wherein the computer-program product further includes instructions that cause the computer to output a final latent representation comparing a first latent variable from at least the first sequence and a second latent variable in a second sequence.

17. The computer-program product of claim 13, wherein the computer-program product further includes instructions that cause the computer to send instructions to the processor to decompose the input data by the residual between the input data and the reconstruction for a previously updated latent variable.

18. The computer-program product of claim 13, wherein the computer-program product further includes instructions to send to the processor to update only one latent variable during each forward pass sequence.

19. The computer-program product of claim 13, wherein the computer-program product further includes instructions to send to the processor to during a second sequence, obtain a second latent variable, generate a second sequential reconstruction of the input data utilizing the decoder and at least the second latent variable, obtain a second residual between the input data and the reconstruction utilizing at least the second latent variable.

20. The computer-program product of claim 13, wherein the input data includes a data set of a plurality of images.

* * * * *